(12) United States Patent
Rustad

(10) Patent No.: US 6,648,123 B1
(45) Date of Patent: Nov. 18, 2003

(54) ARRANGEMENT BY CONVEYOR FOR ITEMS, SUCH AS PACKAGING BODIES OF GLASS, FOR EXAMPLE

(75) Inventor: Hans Ulrik Rustad, Stavern (NO)

(73) Assignee: Repant AS (NO)

( * ) Notice: Subject to any disclaimer, the term of this patent is extended or adjusted under 35 U.S.C. 154(b) by 0 days.

(21) Appl. No.: 10/048,386

(22) PCT Filed: Jul. 4, 2000

(86) PCT No.: PCT/NO00/00231

§ 371 (c)(1),
(2), (4) Date: May 21, 2002

(87) PCT Pub. No.: WO01/09017

PCT Pub. Date: Feb. 8, 2001

(30) Foreign Application Priority Data

Jul. 29, 1999 (NO) .......................................... 19993681

(51) Int. Cl.$^7$ ............................................. B65G 47/24
(52) U.S. Cl. ....................... 198/400; 198/412; 193/47; 193/48
(58) Field of Search ................. 198/400, 406, 198/407, 412; 193/44–48

(56) References Cited

U.S. PATENT DOCUMENTS

| 2,628,098 | A | * | 2/1953 | Bauerschmidt | ............... 473/85 |
| 2,981,394 | A | * | 4/1961 | Stecher | ........................ 193/47 |
| 3,425,530 | A | | 2/1969 | Carter | |
| 3,690,437 | A | | 9/1972 | Kammann | |
| 6,116,406 | A | * | 9/2000 | Marti Sala | ................... 198/395 |
| 6,229,108 | B1 | * | 5/2001 | Gaglione | ..................... 209/524 |
| 6,557,691 | B2 | * | 5/2003 | Ronchi | ........................ 198/400 |

FOREIGN PATENT DOCUMENTS

| FR | 2082158 | 11/1971 |
| WO | 99/59904 | 11/1999 |

* cited by examiner

Primary Examiner—Christopher P. Ellis
Assistant Examiner—Mark A. Deuble
(74) Attorney, Agent, or Firm—Andrus, Sceales, Starke & Sawall

(57) ABSTRACT

The invention relates to an arrangement by a conveyor (1, 2) for items (3), such as packaging bodies of glass, for example, with a means (4) for raising the items (3) from a lying position, in which the bottom of the respective item (3) is oriented in a random direction on the conveyor (1, 2), into a standing position with its bottom turned down against the conveyor (1, 2). In order to obtain, among other things, a compact and reliable construction for the conveyor (1, 2), the raising means is in the form of the raising means (4) extending, before the item (3) enters the raising means (4), essentially in an extension of an upper portion (1) of the conveyor. Further, the raising means (4) is supported rotationally about an axis (5), which is located downstream of the center of gravity of the item (3), when the item (3) has entered the raising means (4), so that on rotation of the raising means (4), the item (3) is raised with its bottom turned downwards, facing a lower portion (2) of the conveyor.

7 Claims, 8 Drawing Sheets

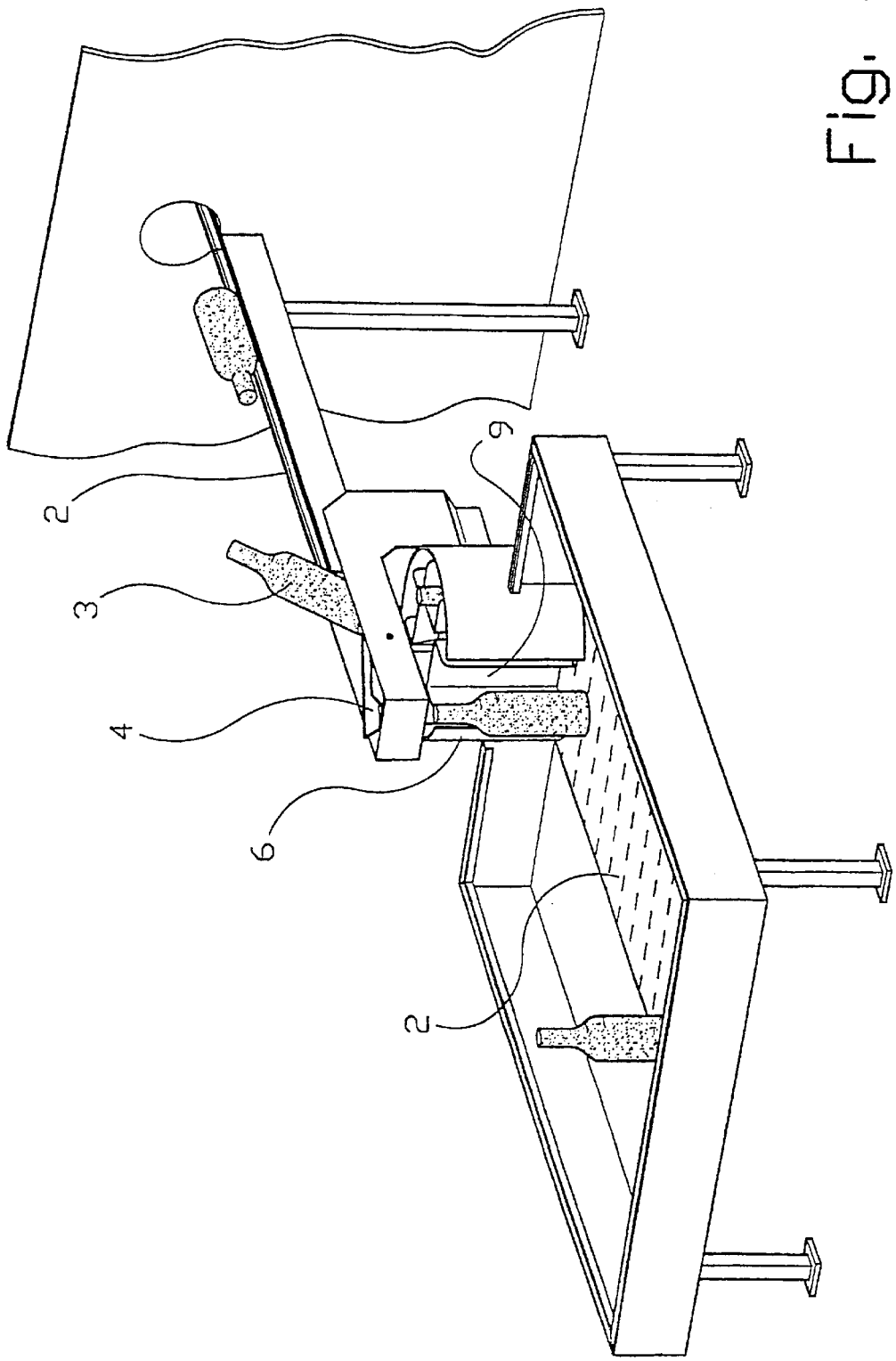
Fig. 5.1

ARRANGEMENT BY CONVEYOR FOR ITEMS, SUCH AS PACKAGING BODIES OF GLASS, FOR EXAMPLE

CROSS REFERENCE TO RELATED APPLICATION

The present application is the U.S. national stage application of International Application PCT/NO00/00231, filed Jul. 4, 2000, which international application was published on Feb. 8, 2001 as International Publication WO 01/09017. The International Application claims priority of Norwegian Patent Application 19993681, filed Jul. 29, 1999.

The invention relates to a device by a conveyor for items, such as packaging bodies of glass, for example, comprising means for raising the respective item from a lying position, in which the bottom of the item points in a random direction in the conveyor, into a standing position with its bottom down, facing the conveyor.

In conveyors of the above-mentioned type, e.g. reverse vending machines for beverage packaging of glass or other material, it is common, at least for the glass packaging, to be raised from a lying into a standing position. This is done to achieve a more suitable positioning of the items on a collecting table, which is necessary in order to have the packaging bodies sorted into crates or other suitable containers for transport. Other types of packaging of unbreakable materials, e.g. steel, aluminium and plastics, do not normally need to be placed on a collecting table. Therefore, unbreakable packaging bodies are commonly separated from the glass packaging bodies upstream of the raising means, in order to be placed subsequently into suitable collecting crates.

In the reverse vending machines previously known, the most common is for the packaging bodies to be guided towards the raising means in a specific orientation, i.e. normally with its bottom leading. Of course, the consumer will have to put the packaging body into the feed opening of the reverse vending machine, with the packaging body oriented in the assumed direction. Then, the packaging body is fixed for a course upstream through the reverse vending machine until reaching the raising means. Of course, the requirement for a particular orientation when the packaging body is being inserted, creates unnecessary trouble for the consumer. Further, suitable equipment is required in the reverse vending machine to detect and return packaging bodies which are inserted in incorrect orientation, and to lock the packaging body in the relevant direction towards the raising means. This involves larger expenses when purchasing reverse vending machines, and causes undesirable stoppage in the event of failure, so that both operating cost and maintenance cost will increase.

However, conveyors do exist, cf. FR 2.083.158 and U.S. Pat. No. 3,690,437, which are constructed so that the items may be guided towards the raising means in random orientations. In both cases the conveyor comprises a raising means which can be swung up, and which hangs down from an upper axle before the arrival of the respective bottle. To turn and raise the bottle, the raising means has an opening opposite its axle, which opening is adapted to hold round the neck of the bottle, when it is the neck that approaches the raising means first. The raising takes place in that the raising means is being swung up, with the bottle neck held firmly within the opening. On the other hand, bottles approaching with their bottoms first, have the correct orientation, and as a consequence of their bottoms being larger than the opening, they will pass without being turned, but here too the raising means will be swung up. Conveyors of this type are space demanding, especially because of the upward slope of the feed track, downstream of the raising means. Moreover, they are primarily meant to be used when bottles in large numbers are to be raised simultaneously in the conveyor, the conveyor comprising several raising means arranged sideways, one after the other. The fact that the raising means is arranged to grip round the bottle neck probably also involves the risk of undesired operational irregularities, so that some bottles may pass without being turned into the upright position by the raising means. Unless the conveyor is also arranged to slow down bottles, which would otherwise fall freely upstream of the raising means, the bottles may be damaged or break due to the relatively large height of fall.

BRIEF DESCRIPTION OF THE INVENTION

An important object of the invention is to provide a device for a conveyor of the type mentioned above, of a construction far more compact and with fewer single components than what has been common so far. This provides the advantage that, without trouble, the device according to the invention may be incorporated into any relevant equipment, e.g. a deposit automate for beverage packaging. Another object is that the respective bottle shall not be lifted by the raising means when being raised, so that no extra push force is needed against the bottle from the conveyor when the bottle is being raised. Further objects are to provide the best operational stability possible, so that all bottles are raised, and at the same time there is no risk of damaging the bottles.

As appears from the characterizing part of the present independent Claim, the above objects and other objects of the invention will be realized in the way that the raising means has the form of a rising means that extends, prior to the item's entering the raising means, in an extension of an upper portion of the conveyor. Further, the raising means is rotationally supported about an axis, which is positioned downstream of the center of gravity of the item when the item has entered the raising means, so that on rotation of the raising means the item is raised into its standing position with its bottom turned down towards a lower portion of the conveyor. Other advantageous features of the invention will appear from the dependent Claims and otherwise from the specification.

BRIEF DESCRIPTION OF THE DRAWING

The invention will be explained in further detail in the following part of the specification and with reference to the set of figures, wherein

FIG. 5.1 shows the same as FIG. 5, but here in a perspective view;

DETAILED DESCRIPTION OF THE INVENTION

Figure 1:
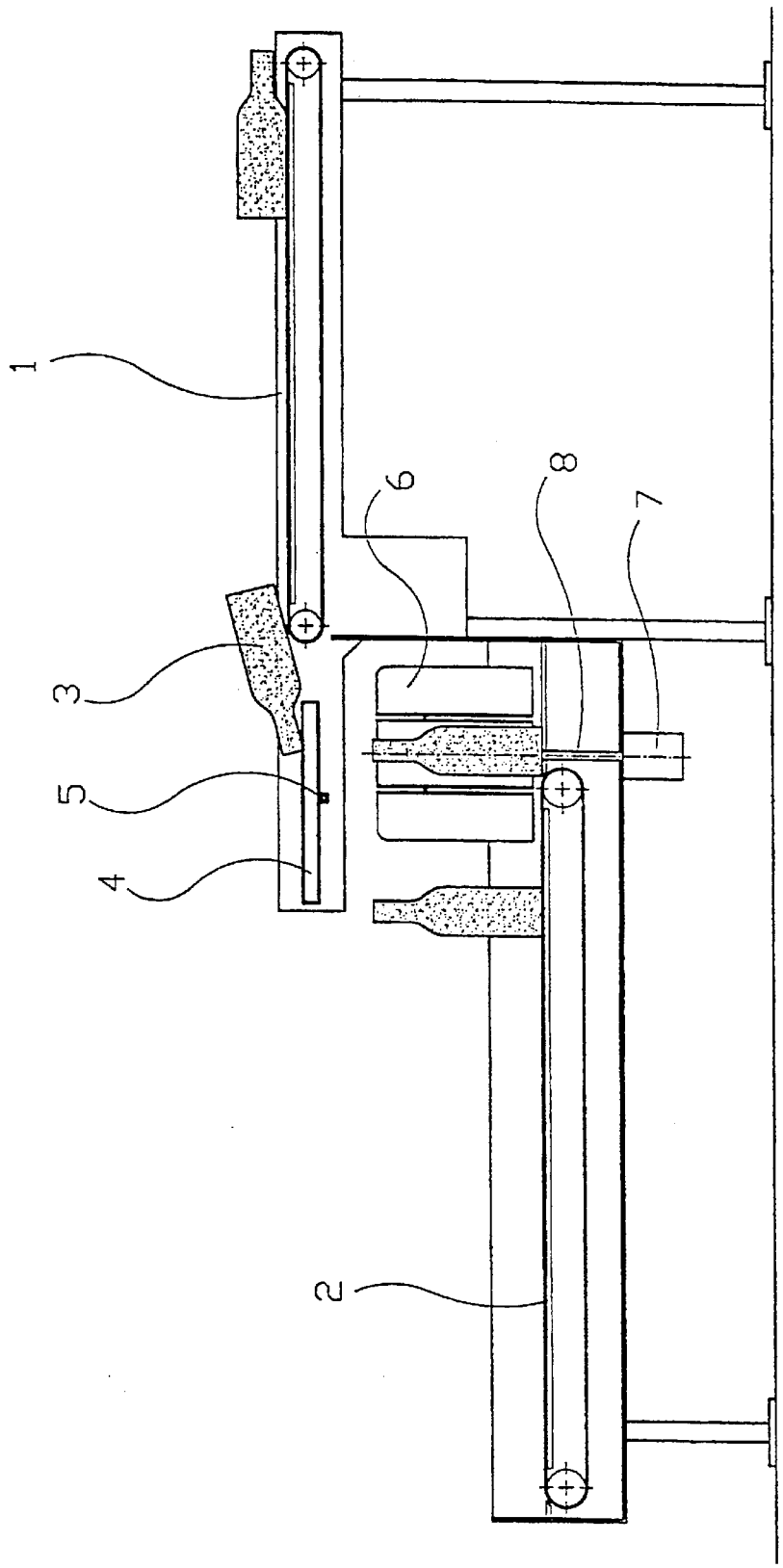
FIG. 1 shows a side view of an upper portion for lying items, and a lower portion for the raised items, of the present conveyor, a raising means, which is rotatable about a horizontal axis arranged in an extension of the upper portion, and a magazine, which can be rotated about a vertical axis by means of a motor, arranged on the lower portion underneath the raising means, an item entering the raising means with its opening leading, and the raising means remaining horizontal during an initial phase of the entering.

According to the invention, the present conveyor comprises an upper portion 1 for lying items 3 having their bottoms pointing in random directions, and a lower portion 2 for the raised items 3 with their bottoms facing downwards against the lower portion 2 of the conveyor. The distance between the upper portion 1 and the lower portion 2 of the conveyor must, of course, be somewhat larger than the height of the items 3 in question. The invention is primarily intended for use with rotationally symmetric items, such as beverage packaging of glass, for example, but clearly it can be used for items of another shape and of any other material.

The raising of the items 3 is effected by means of a raising means 4, which is supported rotationally about an essentially horizontal axis 5. Otherwise, the raising means 4 is arranged so, that in its initial position, i.e. before the respective item 3 enters or is being introduced on the raising means 4, it extends essentially in an extension of the upper portion 1 above the lower portion 2 of the conveyor. The axis 5 is positioned so that it will always be located downstream of the center of gravity of the item 3, which has entered the raising means 4. Thereby the weight of the item entering the raising means 4, will provide rotation thereof, so that the item is raised from its lying position on the upper portion 1 into its standing position with its bottom down against the lower portion 2 of the conveyor. The raising means 4 may be given any suitable shape which will hold the item 3, with its top leading, in a stable lateral position, at least until the raising has been initiated. Further, the distance between the axis 5 and the upper portion 1 of the conveyor will have to be adapted to the items 3 in question.

Figure 2:
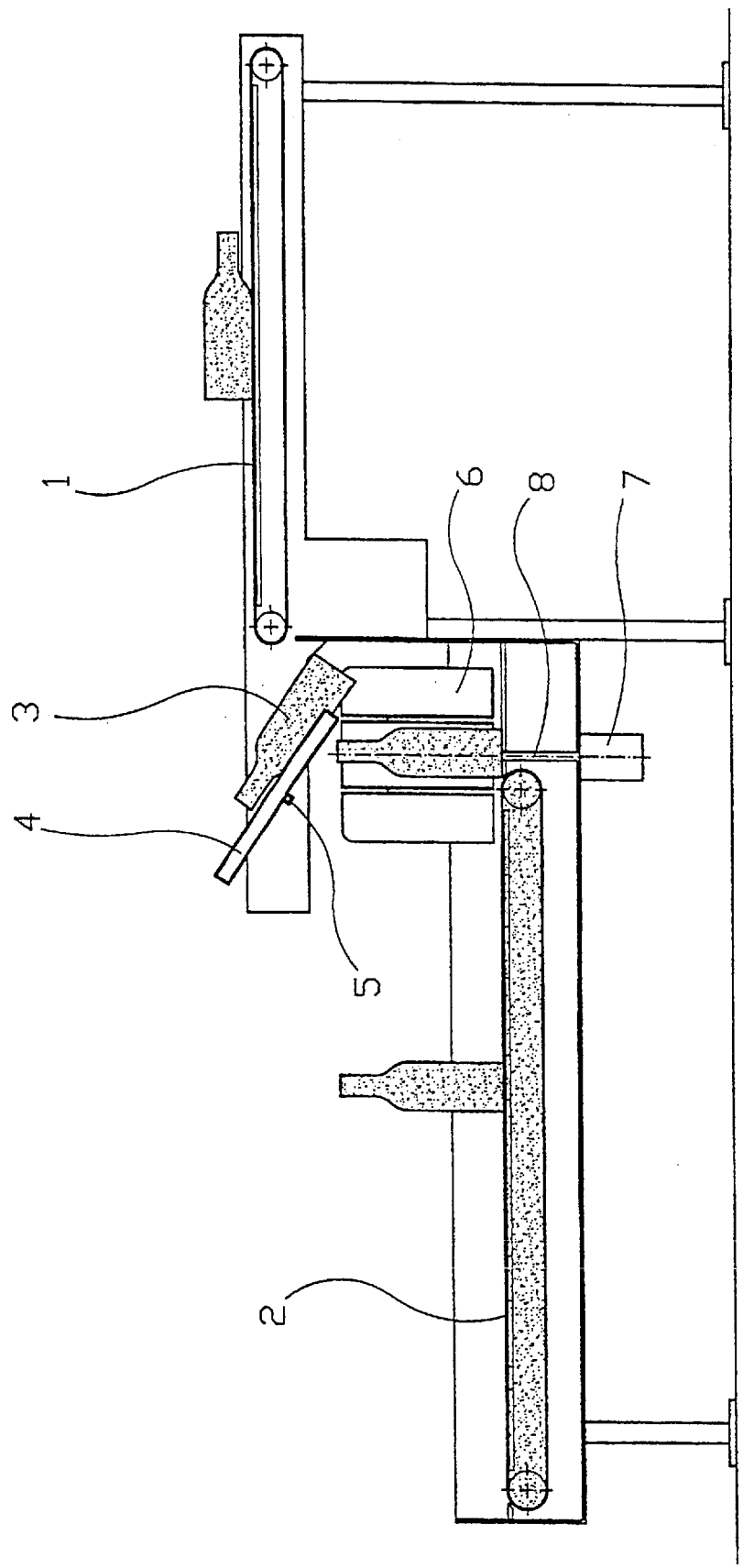
FIG. 2 shows the same as FIG. 1, but here the rotation of the raising means with the item entered, has started in order, thereby, to raise and at the same time insert the item into the chamber above the lower portion of the conveyor, the rotation taking place by means of the weight of the item, and starting only when the item has passed far enough onto the raising means.
Figure 3:
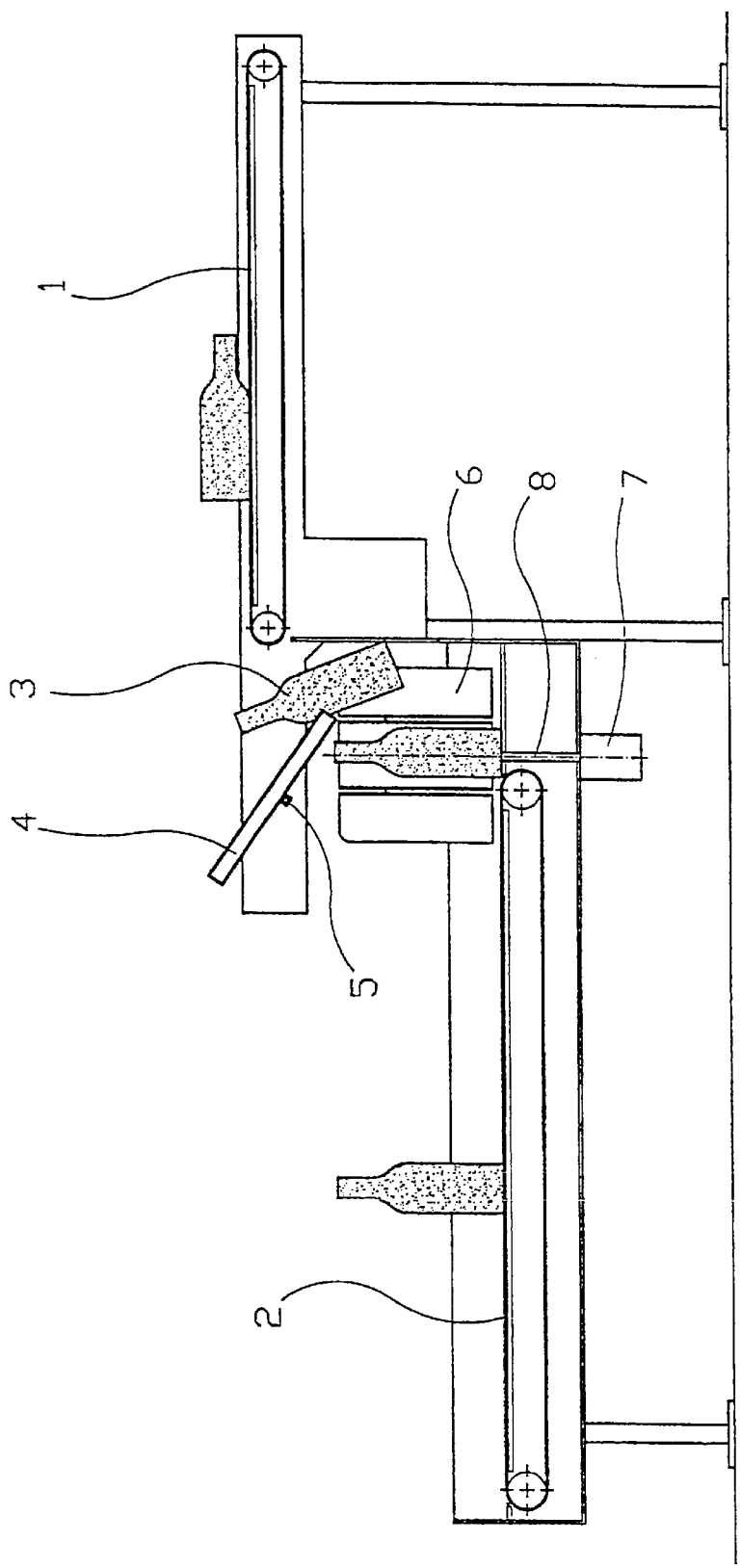
FIG. 3 shows the same as FIG. 2, but here immediately before the items slides off the raising means into the magazine.
Figure 4:
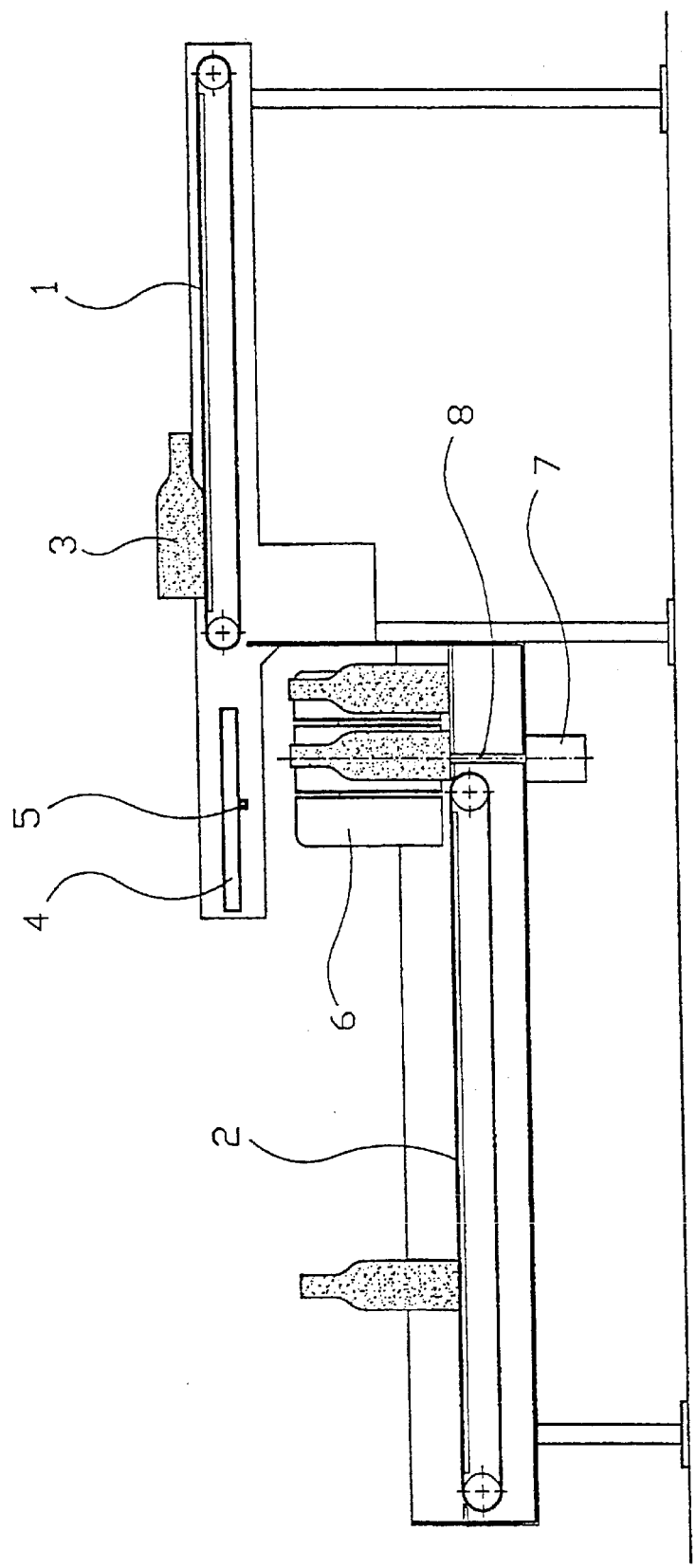
FIG. 4 shows the same as FIG. 1, but here with the item raised in the magazine and with the raising means returned to its horizontal position before another item, with its bottom leading, enters the raising means.
Figure 5:
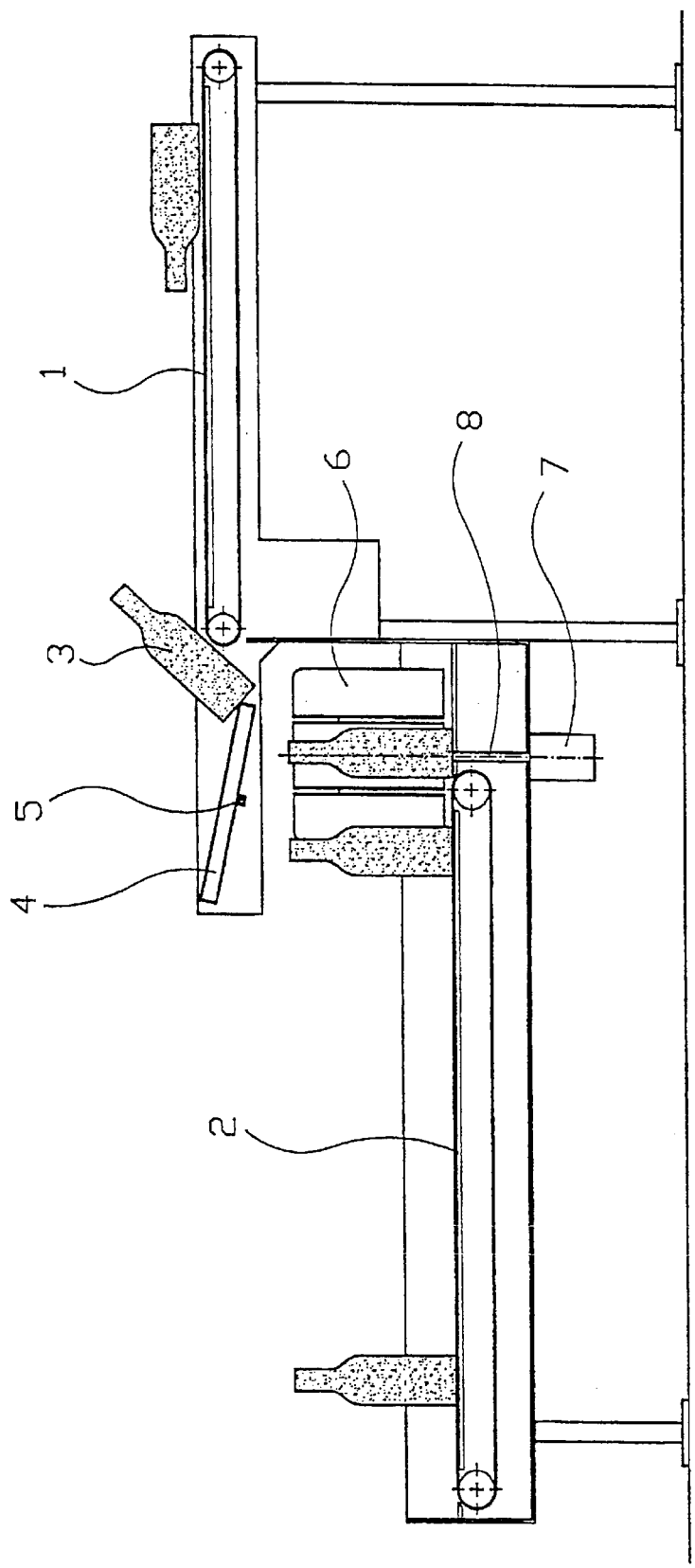
FIG. 5 shows the same as FIG. 4, but here, already during the initial phase of the entering, the weight of the item will start the rotation of the raising means for the raising and introduction of the item into the magazine.
Figure 6:
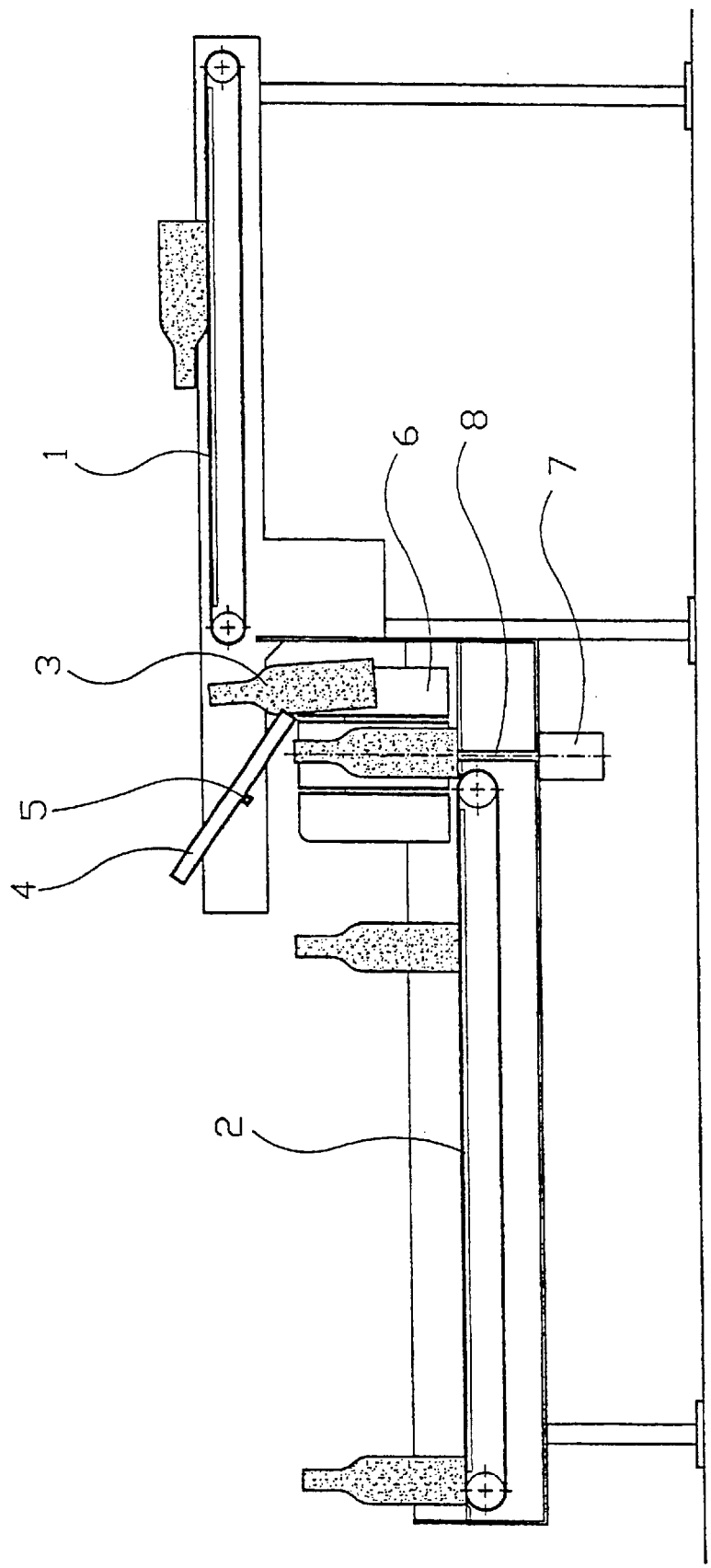
FIG. 6 shows the same as FIG. 5, but here immediately before the item obtains its upright position in the magazine.
Figure 7:
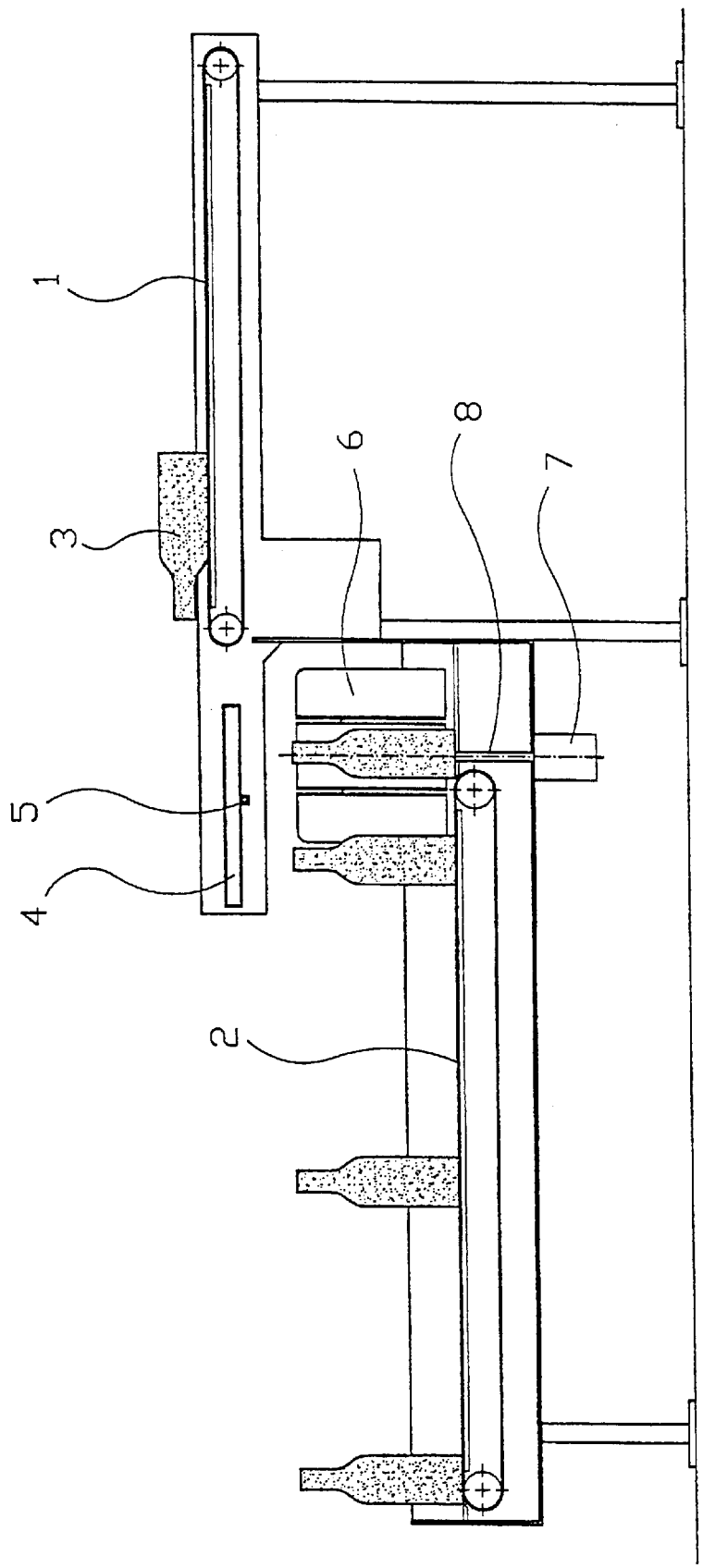
FIG. 7 shows the same as FIG. 5, but here with the item upright in the magazine and the raising means returned to its horizontal initial position, before another item, with its opening leading, enters the raising means.

As the item enters the raising means 4 with its top leading, the raising means 4 maintains its initial position, as shown in FIGS. 1–3, until a relatively large part of the item 3 has entered the raising means 4. Thereby the rotation to put the item 3 upright on the lower portion 2 of the conveyor is started only when a sufficient portion of the weight of the item 3 has been introduced on the raising means 4. On the other hand, if the item 3 is introduced on the raising means 4 with its bottom leading, as shown in FIGS. 5–6, the weight of the item 3 will be sufficient to initiate the rotation at a much earlier point, without the item 3 having to be introduced on the raising means 4 to any extent worth mentioning. In other words, this means that the rotation of the raising means 4 for the raising of the item 3 is driven and controlled by the item 3 which is to be raised in the conveyor. Alternatively, e.g. when the items 3 in question are not of sufficient weights themselves to cause rotation of the raising means, an actuator, not shown, may drive and control the rotation. The actuator may be controlled for example through information about the item 3 recorded in a control unit, not shown, placed upstream of the raising means 4. In the former case the raising means 4 is returned, after its rotation, to its initial position by a means not shown, e.g. a tension spring positioned round the axis 5, which is tightened when the raising means is rotated to raise the item 3.

The conveyor preferably also comprises a revolving magazine 6 positioned on the lower portion 2 of the conveyor underneath the raising means 4, and containing at least one chamber for receiving the item 3 after this has been turned in the raising means 4. The magazine 6 is rotated about an essentially vertical axis 8 by means of a motor 7. Of course, the rotation of the magazine 6 is adjusted according to how the item 3 is introduced from the raising means 4, and the magazine has an outlet 9 for the items 3 towards the lower portion 2 of the conveyor, preferably opposite the feeding point of the magazine 6. The lower portion 2 of the conveyor may be formed, if necessary, as a suitable collecting table for the raised items 3. Further, the upper portion 1 of the conveyor upstream of the raising means 4 may comprise a means, not shown, for orienting the items 3 essentially in the longitudinal direction of the raising means 4. It will also be appreciated that without problems the conveyor may be incorporated as part of a deposit and return automate, without any particular adjustments thereof.

What is claimed is:

1. An arrangement by a conveyor (1, 2) for items (3), such as packaging bodies of glass, for example, comprising a means (4) for raising the items (3) from a lying position, in which the bottom of the respective item (3) is oriented in a random direction on the conveyor (1, 2), into a standing position with the bottom thereof facing the conveyor (1, 2), characterized in that the raising means is in the form of a raising means (4) extending, before the item (3) enters the raising means (4), essentially in an extension of an upper portion (1) of the conveyor, and the raising means (4) is rotationally supported about an axis (5), which is located downstream of the center of gravity of the item (3), after the item (3) has entered the raising means (4), so that on rotation of the raising means (4) the item (3) is raised into its standing position with its bottom downwards, facing a lower portion (2) of the conveyor.

2. An arrangement according to claim 1, characterized in that on entering the raising means (4), the item (3) drives and controls the rotation of the rising means (4) to raise the item (3) on the lower portion (2) of the conveyor.

3. An arrangement according to claim 1, characterized in an actuator driving and controlling the rotation of the raising means (4) for raising the item (3) on the lower portion (2) of the conveyor, the actuator being controlled by information recorded in a control unit located upstream of the raising means (4).

4. An arrangement according to claim 1, characterized in that the lower portion (2) of the conveyor comprises a revolving magazine (6) with at least one chamber for receiving the one or several raised item(s) (3).

5. An arrangement according to claim 1, characterized in that the lower portion (2) of the conveyor is a collecting table for the raised items (3).

6. An arrangement according to claim 1, characterized in that the upper portion (1) of the conveyor, upstream of the raising means (4), comprises means for orienting the item (3) essentially in the longitudinal direction of the raising means (4).

7. An arrangement according to claim 1, characterized in that the device is a component of a deposit and return automate.

* * * * *